United States Patent
Saifullah et al.

(10) Patent No.: US 8,140,077 B2
(45) Date of Patent: Mar. 20, 2012

(54) HANDOVER OR LOCATION UPDATE FOR OPTIMIZATION FOR RELAY STATIONS IN A WIRELESS NETWORK

(75) Inventors: Yousuf Saifullah, Flower Mound, TX (US); Haihong Zheng, Coppell, TX (US); Shashikant Maheshwari, Irving, TX (US)

(73) Assignee: Nokia Corporation, Espoo (FI)

(*) Notice: Subject to any disclaimer, the term of this patent is extended or adjusted under 35 U.S.C. 154(b) by 411 days.

(21) Appl. No.: 11/406,754

(22) Filed: Apr. 19, 2006

(65) Prior Publication Data

US 2007/0249347 A1    Oct. 25, 2007

(51) Int. Cl.
*H04W 36/00* (2009.01)

(52) U.S. Cl. ........ 455/438; 455/436; 455/437; 455/439; 455/440; 455/441; 455/442; 455/443; 455/444

(58) Field of Classification Search .................. 455/436, 455/437, 438, 439, 440, 441, 442, 443, 444
See application file for complete search history.

(56) References Cited

U.S. PATENT DOCUMENTS

| | | | |
|---|---|---|---|
| 5,970,408 A | | 10/1999 | Carlsson et al. |
| 6,256,501 B1* | | 7/2001 | Tokuyama et al. ........... 455/442 |
| 6,263,204 B1* | | 7/2001 | Kusaki et al. ................ 455/439 |
| 6,490,452 B1* | | 12/2002 | Boscovic et al. ............. 455/436 |
| 7,295,541 B2* | | 11/2007 | Matsuo et al. ................ 370/338 |
| 2004/0058678 A1* | | 3/2004 | deTorbal ....................... 455/437 |
| 2005/0197121 A1* | | 9/2005 | Fujiwara et al. ........... 455/435.1 |
| 2005/0282547 A1* | | 12/2005 | Kim et al. ..................... 455/436 |
| 2006/0068789 A1* | | 3/2006 | Vannithamby et al. ....... 455/436 |
| 2012/0002589 A1 | | 1/2012 | Saifullah |

FOREIGN PATENT DOCUMENTS

| | | |
|---|---|---|
| EP | 1058473 A1 | 12/2000 |
| EP | 1104977 A1 | 6/2001 |
| EP | 1113679 A2 | 7/2001 |
| EP | 1401229 A1 | 3/2004 |
| EP | 1739894 A1 | 1/2007 |
| GB | 2392346 A | 2/2004 |
| GB | 2422515 A | 7/2006 |

(Continued)

OTHER PUBLICATIONS

"International search report and written opinion received", PCT/IB2007/001018, (Nov. 16, 2007).

(Continued)

*Primary Examiner* — Rafael Pérez-Gutiérrez
*Assistant Examiner* — Liton Miah
(74) *Attorney, Agent, or Firm* — Brake Hughes Bellermann LLP (57) ABSTRACT

Various embodiments are disclosed relating to the optimization of relay station handovers and location update in a wireless network. According to an example embodiment, a request to handover a plurality of mobile stations from a first base station to a second base station may be sent. An identifier associated with the second base station for each of the plurality of mobile stations may be received. In another example embodiment, each of the identifiers is forwarded to the mobile station corresponding to the connection identifier. In another example embodiment, a location update may be performed by sending a message to a network device, such as a target base station, to provide location update information for a plurality of mobile stations. In this manner, one message may be transmitted over a wireless link to facilitate a handover or location update for a plurality of mobile stations.

15 Claims, 10 Drawing Sheets

FOREIGN PATENT DOCUMENTS

| | | |
|---|---|---|
| JP | 09-327057 A | 12/1997 |
| JP | 2001-189949 A | 7/2001 |
| WO | 0038446 A1 | 6/2000 |
| WO | 2007/078138 A2 | 7/2007 |
| WO | 2007119168 A2 | 10/2007 |

OTHER PUBLICATIONS 802.16 IEEE Standard for Local and Metropolitan Area Networks, Part 16: Air Interface for Fixed Broadband Wireless Access Systems (Oct. 1, 2004).

802.16e IEEE Standard for Local and Metropolitan Area Networks, Part 16: Air Interface for Fixed Broadband Wireless Access Systems, Amendment 2: Physical and Medium Access Control Layers for Combined Fixed and Mobile Operation in Licensed Bands and Corrigendum 1 (Feb. 28, 2006).

First Office Action for Chinese Application No. 200780018306.8 (with English Translation), mailed on Sep. 27, 2010, 13 pages.

"Part 16: Air Interface for Fixed and Mobile Broadband Wireless Access Systems", Amendment 2: Physical and Medium Access Control Layers for Combined Fixed and Mobile Operation in Licensed Bands and Corrigendum 1, IEEE Standards for Local and metropolitan Networks, 2005, 100 pages.

Notice of Preliminary Rejection for Korean Patent Application No. 10-2008-7025410 (includes English Translation), mailed on Jun. 24, 2010, 6 pages.

Office Action received for Philippines Patent Application No. 1-2008-502311, mailed on Sep. 16, 2011, 1 page.

Office Action for Chinese Patent Application No. 200780018306.8 (with English Translation), mailed on Jul. 13, 2011, 14 pages.

Kim, Sungkyung, et al., "Group Handover on the Mobile RS", IEEE 802.16 Broadband Wireless Access Working Group, IEEE C802.16j-06/227r1, Nov. 13, 2006, 9 pages.

Extended European Search Report for European Patent Application No. 07734337.4, mailed on Sep. 5, 2011, 14 pages.

Office Action for Japanese Patent Application No. 2009-505986 (with English Translation), mailed on May 24, 2011, 8 pages.

U.S. Appl. No. 13/227,039 Non-Final Office Action mailed Dec. 23, 2011, 34 pages.

\* cited by examiner

HANDOVER OR LOCATION UPDATE FOR OPTIMIZATION FOR RELAY STATIONS IN A WIRELESS NETWORK

BACKGROUND

As wireless technology has advanced, a variety of wireless networks have been installed, such as cellular and other wireless networks. Some wireless networks are based upon the Institute of Electrical and Electronics Engineers (IEEE) 802.11 family of Wireless LAN (WLAN) industry specifications, for example. Other wireless technologies are being developed, such as IEEE 802.16 or WiMax industry specifications. IEEE 802.16 defines the Wireless MAN air interface specification for wireless metropolitan area networks. A number of working groups are working to improve on this technology.

One proposed amendment to the 802.16 specification has proposed the use of relay stations that may be used to expand coverage and enhance throughput of a wireless network. In such a network, mobile stations may communicate with a base station via a relay station.

In addition, a basic function that many wireless networks perform is mobility of a mobile station from a first base station or access point to a second base station. The mobility in active mode is typically called handover and the mobility in idle mode is typically called location update. For handover, in some networks, a base station may be configured to scan signals, such as signals relating to mobile stations, and other base stations such as neighboring base stations. In some cases, when certain signal conditions are met, a handover may be requested to handover the mobile station from the current base station to a target base station, e.g., based on a higher channel quality at the target base station. For location update, a base station broadcasts its location identifier. An mobile station may receive the location identifier. If it finds it different than its registered location identifier, it may begin a signaling procedure to register in the new location. However, as wireless networks become more complex, the handover process and/or the location update may become more challenging.

SUMMARY

Various embodiments are disclosed relating to handover or location update optimization for relay stations in a wireless network.

According to an example embodiment, a request to handover a plurality of mobile stations from a first base station to a second base station may be sent. An identifier associated with the second base station for each of the plurality of mobile stations may be received. In an example embodiment, each of the identifiers may be forwarded to the mobile station corresponding to the identifier. In an example embodiment, the request to handover is sent by the relay station. In an example embodiment, the request to handover may be sent by the first base station.

In another example embodiment, a determination may be made to handover a plurality of mobile stations based on information related to a first base station and a second base station. A request may be sent to handover the plurality of mobile stations from the first base station to the second base station based on the determination. An identifier associated with the second base station for each of the plurality of mobile stations may be received.

In a further example embodiment, an apparatus may be provided in a station for wireless communication. The apparatus may include a controller, a memory coupled to the controller, and a wireless transceiver coupled to the controller. The apparatus may send a request to handover a plurality of mobile stations from a first base station to a second base station, and receive an identifier associated with the second base station for each of the plurality of mobile stations. In an example embodiment, the apparatus may include an apparatus provided in a relay station. In another embodiment, the apparatus may include an apparatus provided in a base station or access point.

In another example embodiment, a location update may be performed by sending a message to a network device, such as a target base station, to provide location update information for a plurality of mobile stations. According to an example embodiment, a change in location may be detected, e.g., by receiving a new paging group ID, and a message may be sent to a network device to perform location update for a plurality of mobile stations. By sending a location update message for a plurality or group of mobile stations, such as from a relay station, congestion over a wireless link may be decreased. In this manner, one message may be transmitted over a wireless link to facilitate a handover or location update for a plurality of mobile stations.

The details of one or more implementations are set forth in the accompanying drawings and the description below. Other features will be apparent from the description and drawings, and from the claims.

DETAILED DESCRIPTION

Figure 1:
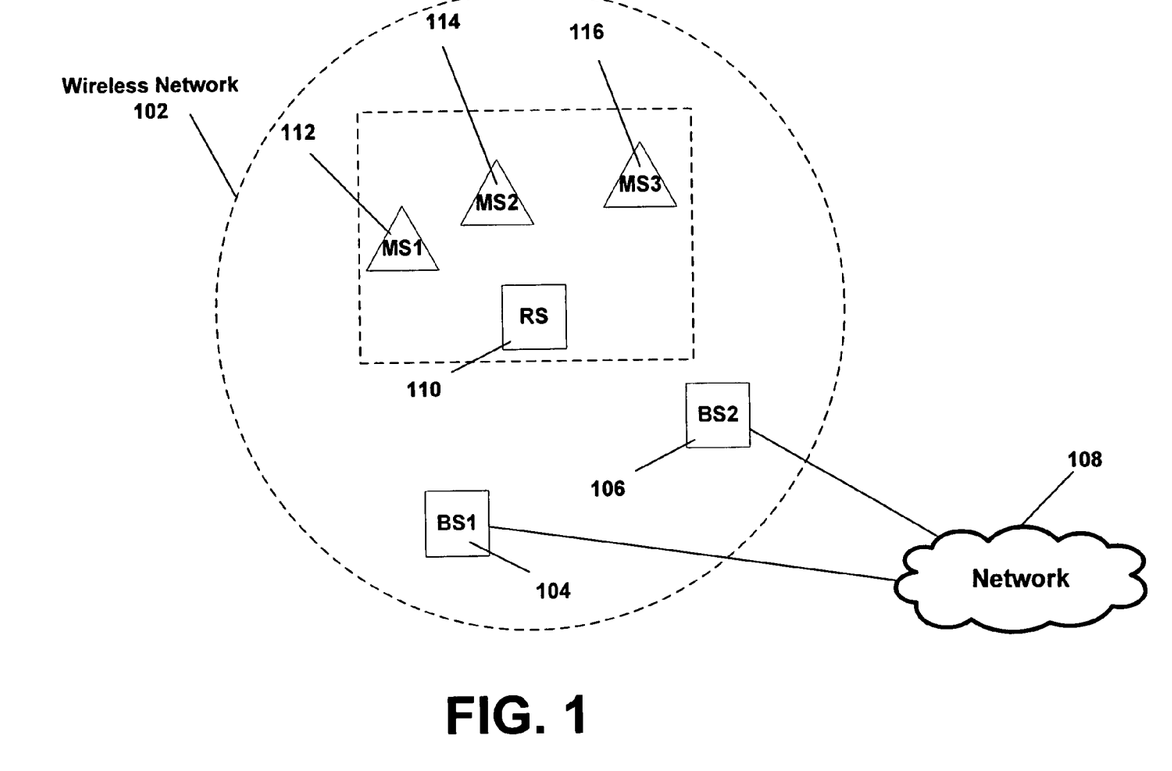
FIG. 1 is a block diagram illustrating a wireless network according to an example embodiment.

Referring to the Figures in which like numerals indicate like elements, FIG. 1 is a block diagram illustrating a wireless network 102 according to an example embodiment. Wireless network 102 may include a number of wireless nodes or stations, such as base stations BS1 104 and BS2 106, a relay station RS 110, and a group of mobile stations, such as MS1

112, MS2 114, and MS3 116. While only two base stations, one relay station, and three mobile stations are shown in wireless network 102, any number of base stations, relay stations, and mobile stations may be provided. Each base station 104, 106 may be coupled to a fixed network 108, such as a Wide Area Network (WAN), the Internet, etc., and may also be coupled to other wireless networks. The group of mobile stations MS1 112, MS2 114, and MS3 116 may communicate with a base station 104 or 106 via the relay station 110.

According to an example embodiment, mobile stations MS1 112, MS2 114, and MS3 116 may initially be associated with base station BS1 104, for example, and the mobile stations may communicate with BS1 104 via relay station 110. In an example embodiment, relay station 110 may travel or move with the mobile stations MS1 112, MS2 114, and MS3 116, with respect to base station BS1 104. For example, the mobile stations MS1 112, MS2 114, and MS3 116 and the relay station 110 may move together on a vehicle, such as a boat, bus, train, airplane, etc. Thus, at some point, the group of mobile stations MS1 112, MS2 114, and MS3 116 and the relay station 110 may move out of range of the currently associated base station, BS1 104, and may thus need to be handed over to one or more new base stations, e.g., BS2 106, as they travel. It is also possible that additional mobile stations or subscriber stations (not shown) may communicate with the base station 104 or 106, and that the additional mobile stations or subscriber stations are not moving with the relay station 110.

In yet another embodiment, the mobile stations may move independently from relay station RS 110 and the base stations, and relay station RS 110 may move or be mobile as well with respect to the base stations and mobile stations.

The various embodiments described herein may be applicable to a wide variety of networks and technologies, such as WLAN networks, 802.11 networks, WiMAX networks, IEEE 802.16 type networks, cellular networks, radio networks, or other wireless networks. A wireless relay network may be an example of a multi-hop system in which end nodes, for example, mobile stations or subscriber stations, may be connected to the base station via the relay station, such as RS 110, for example. Traffic between the mobile stations or subscriber stations and the base station may pass through, and be processed by, the relay station 110, for example. As an example, a relay station may be used to extend the network coverage and/or enhance the system throughput. For example, the traffic sent from a relay station may be scheduled by the relay station itself or scheduled by the base station instead. In some cases, a relay station may receive and decode a frame from a base station, and then forward the frame to the respective mobile station or subscriber station.

Figure 2:
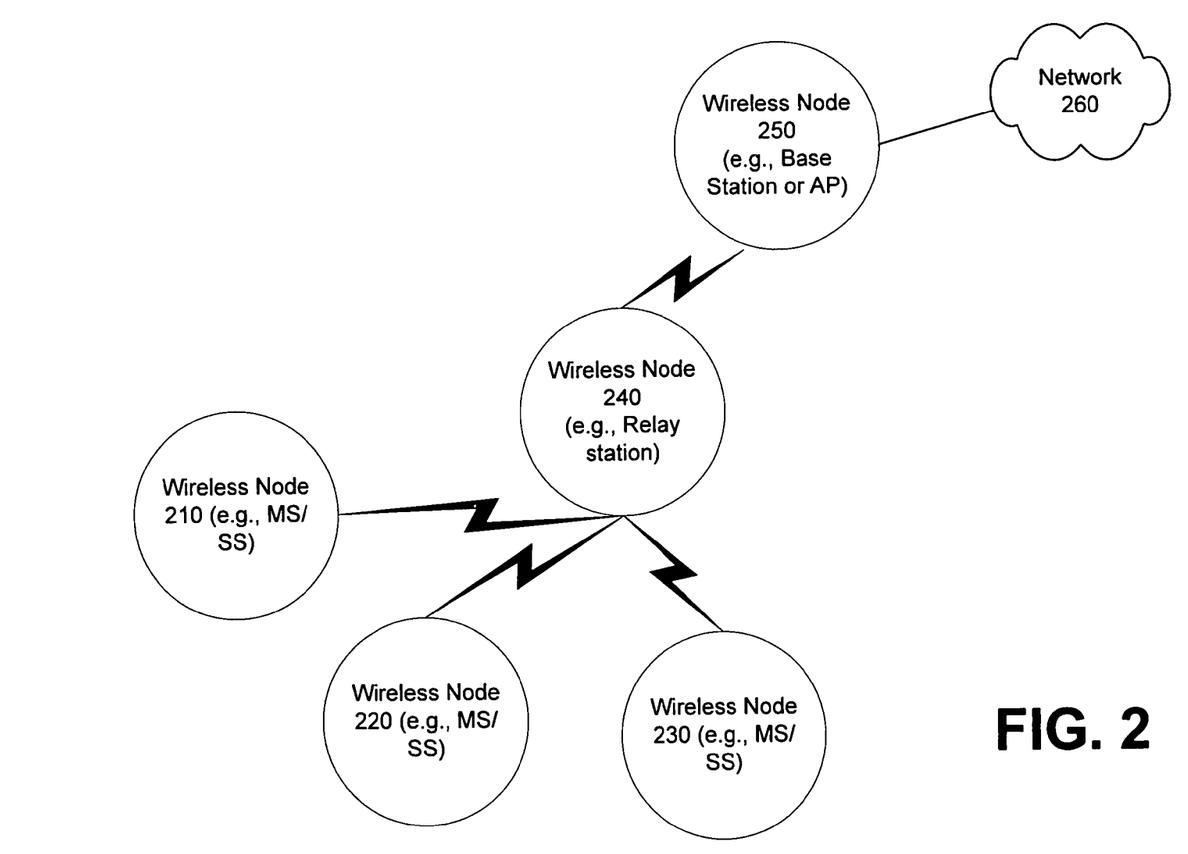
FIG. 2 is a diagram of an example multi-hop environment according to an embodiment.

FIG. 2 is a diagram of a multi-hop environment according to an example embodiment. A group of wireless nodes 210, 220, and 230, which may be mobile stations or subscriber stations (MS/SS) may each be coupled via a wireless link to a wireless node 240. As an example, the wireless nodes 210, 220, 230 may include mobile telephones, wireless digital assistants (PDAs), or other types of wireless access devices, or mobile stations. The term "node" may refer, for example, to a wireless station, e.g., a subscriber station or mobile station, an access point or base station, a relay station or other intermediate wireless node, or other wireless computing device, as examples. Wireless node 240 may be, for example, a relay station or other node. Wireless node 240 may be coupled to a wireless node 250 via a wireless link. Wireless node 250 may be, for example, a base station (BS), access point (AP) or other wireless node. Wireless node 250 may be coupled to a fixed network, such as network 260 for example. Frames or data flowing from nodes 210, 220, and 230 to node 240 to node 250 may be referred to as the uplink (UL) or upstream direction, whereas frames flowing from node 250 to node 240 and then to nodes 210, 220, and 230 may be referred to as the downlink (DL) or downstream direction, for example.

In an example embodiment, if the node 240, e.g., relay station, 240 is moving from one location to another location, the node 240 may experience, for example, a low signal-to-noise ratio in its communications with the node 250, and thus it may become desirable to request a handover, or handoff, of the nodes 210, 220, and 230 from the node or base station 250 to another base station or access point that currently provides a higher signal-to-noise ratio in its communications with the node 240. As another example, the node 240 or node 250 may receive measurement reports, or receive a signal to noise (S/N) ratio, a received signal strength, bit error rate, packet error rate, or other channel quality parameter that may indicate a quality of a signal between the node 240 and the respective node 250, or base station, and may determine that a handover should be requested, based on the received information. If the nodes 210, 220, and 230 were each to request and handle handover requests individually, a significant amount of wireless traffic may be generated between the nodes 210, 220, and 230, the node 240, and the node 250 to achieve the handover. Thus, according to an example embodiment, an optimized relay station handover may be provided to decrease air traffic associated with the handover and improve throughput. According to an example embodiment, a handover may be requested and/or performed together for a plurality mobile stations, e.g., via a single handover request message for the plurality of mobile stations, rather than sending a separate handover request independently for each mobile station, for example.

Figure 3:
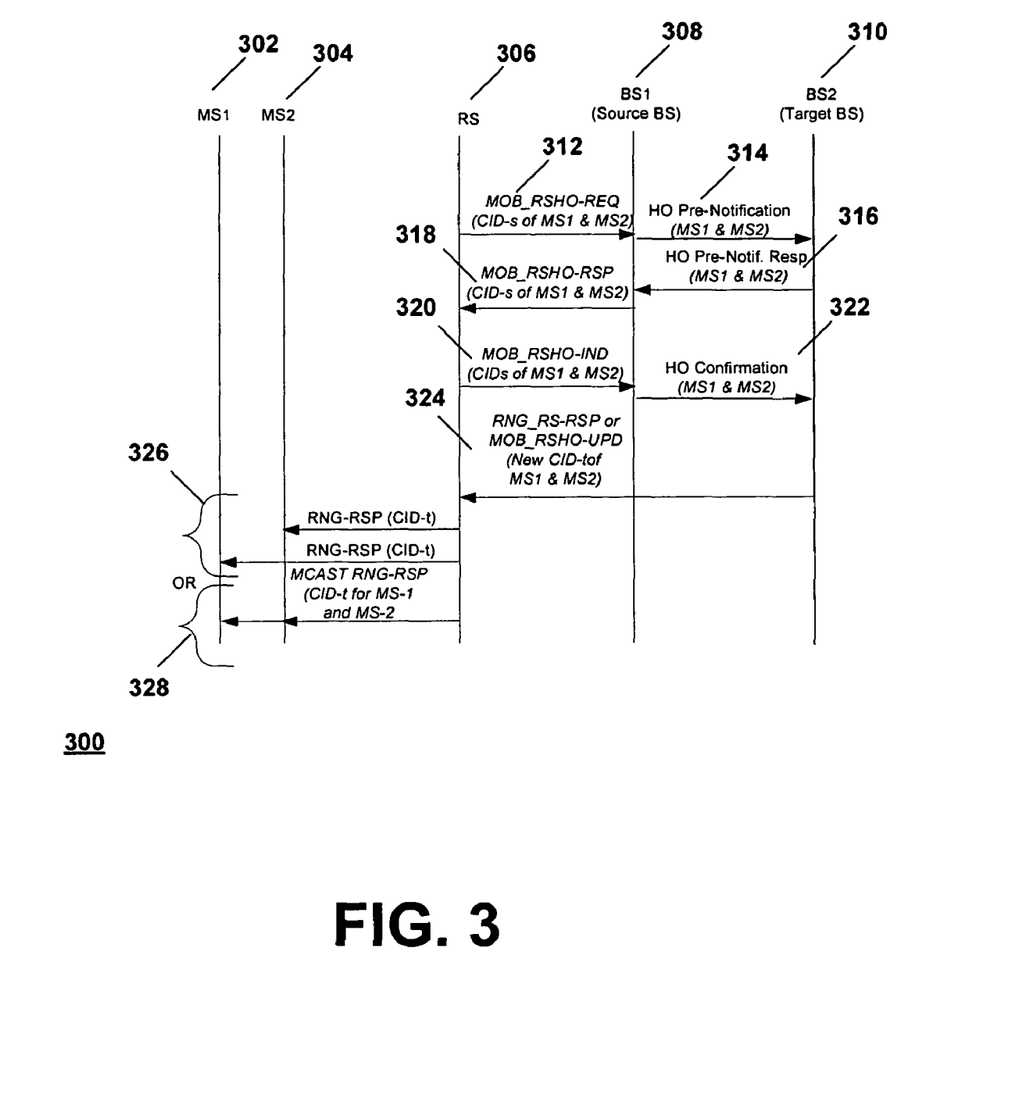
FIG. 3 is a diagram illustrating operation of handover for a plurality of mobile stations according to an example embodiment.

FIG. 3 is a diagram 300 illustrating operation of a relay station handover according to an example embodiment. In the example shown in FIG. 3, mobile stations 302 and 304 may be in communication with a relay station 306 (RS), which may be in further communication with a first, or source base station (BS1) 308 and a second, or target base station (BS2) 310. Initially, mobile stations 302 and 304 are associated only with source base station 308, and may communicate with base station 308 via relay station 306.

As shown in the example, a message, e.g., a mobile relay station handover request message (MOB-RSHO-REQ) 312 may be sent from the relay station 306 to the source base station (BS1) 308. The mobile relay station handover request message 312 may include identifiers identifying a plurality or group of mobile stations, for example, MS1 302 and MS2 304, to be handed over to the second base station (BS2) 310. The identifiers may be any type of identifiers, such as MS (mobile station) identifiers identifying each mobile station, or a connection identifier (CID) for each of mobile stations 302, 304. These identifiers, e.g., CIDs, for each mobile station maybe associated with, or used for communication with, the source base station 308. In other words, there may be a specific CID assigned by a base station for each mobile station that is associated with the base station, for example. The identifiers may be, for example, connection identifiers (CIDs) as used for media access control (MAC) communications with mobile stations in accordance with IEEE 802.16, 802.11 or other wireless specification or technology. The mobile relay station handover request message (MOB-RSHO-REQ) 312 is optional, as the source base station 308 may itself initiate the handover.

A determination may be made to initiate a handover of the mobile stations 302, 304 from the source base station 308 to the target base station 310 based on, for example, received channel quality information, such as signal to noise rations, received signal strength, or other channel quality parameters, or received measurement reports e.g., obtained from scanning signals, for example, among the mobile stations 302, 304, the relay station 306, the source base station 308, and the target base station 310 or other neighboring base stations. The measurement reports may include information such as signal-to-noise ratios or other information relating to signal quality among the mobile stations 302, 304, the relay station 306, the source base station 308, and the target base station 310. The scanning may be performed by, for example, the relay station 306 and/or the source base station 308, and the source base station 308 may trigger the handover request by sending (not shown) a trigger message to the relay station 306 to initiate the handover of the mobile stations 302, 304.

Such a determination to initiate a handover of the mobile stations 302, 304 may, for example, occur as a result of the relay station 306 and/or the mobile stations 302, 304 moving out of range of the source base station 308, and into the range of the target base station 310. The source base station 308 or the relay station 306 may analyze measurement reports of signal data for several other base stations such as base stations neighboring the source base station 308, and may determine, based on the measurement reports, that a handover should be requested, and that the target base station 310 may be an optimal candidate to become the new, or target base station for the communications with the relay station 306 and mobile stations 302, 304. Thus, the determination to request handover made by the source base station 308 or the relay station 306 may be based on measurement reports generated by either the relay station 306 or the source base station 308, or received from other sources, or on a received signal to noise (S/N) ratio, received signal strength, or any other channel quality parameter that may indicate a quality of a signal between the relay station and the respective base station. For example, the mobile stations 302, 304 may be traveling with the relay station 306, for example, on a vehicle such as a boat, train, airplane, or bus, and the vehicle may be moving out of range of the source base station 308 and into range of the target base station 310, thus triggering a request for a handover.

Further, the relay station 306 or the source base station 308 may determine that a subset of mobile stations or subscriber stations currently in communication with the relay station 306 may enter into a state that may trigger a request for handover, and other mobile stations or subscriber stations currently in communication with the relay station 306 may not enter into such a state, and thus may not trigger a request for handover. Thus, the relay station 306 or the source base station 308 may request handover of a group, or subset, of the mobile stations or subscriber stations currently in communication with the relay station 306.

After the relay station handover request message 312 is sent to BS 308, or a decision is otherwise made at BS 308 to perform a handover of a group of mobile stations, the source base station 308 may then send a handover pre-notification message 314 to the target base station 310. The handover pre-notification message 314 may serve as a request for the target base station 310 to reserve resources and accept handover of the mobile stations 302, 304 from the source base station 308 to the target base station 310. If the target base station 310 accepts the request and reserves the resources to accommodate the handover, the target base station 310 may send a handover pre-notification response message 316 to the source base station 308 as an acceptance of the request to handover the mobile stations 302, 304. The source base station 308 may then send a mobile relay station handover response (MOB-RSHO-RSP) message 318, which includes the identifiers associating the respective mobile stations 302, 304 with the source base station 308, to the relay station 306. The relay station 306 may respond by sending a mobile relay station handover indication (MOB-RSHO-IND) message 320 to the source base station 308 to indicate confirmation by the relay station 306 of the handover. The source base station 308 may then send a handover confirmation message 322 to the target base station 310 informing the target base station 310 that the relay station 306 has acknowledged the handover.

At this point, the target base station 310 may generate new identifiers, for example, connection identifiers (CIDs), for each of the mobile stations 302, 304, or other identifiers. The new identifiers, e.g., CIDs, may identify a connection between each of the mobile stations 302, 304 and the target base station 310. The target base station 310 may then send a ranging relay station response, or a mobile relay station handover update message 324 that includes the new identifiers, for example, the connection identifiers, to the relay station 306. The relay station 306 is now associated with the target base station 310, and may send a ranging response message (RNG-RSP) 326 that includes the new identifier to each of the mobile stations 302, 304 as a unicast message. Alternatively, the relay station 306 may send a ranging response (RNG-RSP) message 328 that includes the new identifiers to the mobile stations 302, 304 as a multicast message. According to an example embodiment, a ranging response (RNG-RSP) message may be sent by a base station to send corrections or updated information based on measurements that have been made on other received data or media access control (MAC) messages, for example. The ranging response message may include the new identifier for the mobile station as a parameter.

The mobile station 302, 304 may then replace the previous identifier, for example, the connection identifier associating each of the mobile stations 302, 304 with the source base station 308, with the new connection identifier associating each of the mobile stations 302, 304 with the target base station 310. Each of the mobile stations 302, 304 and the relay station 306 are now associated with the target base station 310, and communications may now proceed with the target base station 310.

Figure 4:
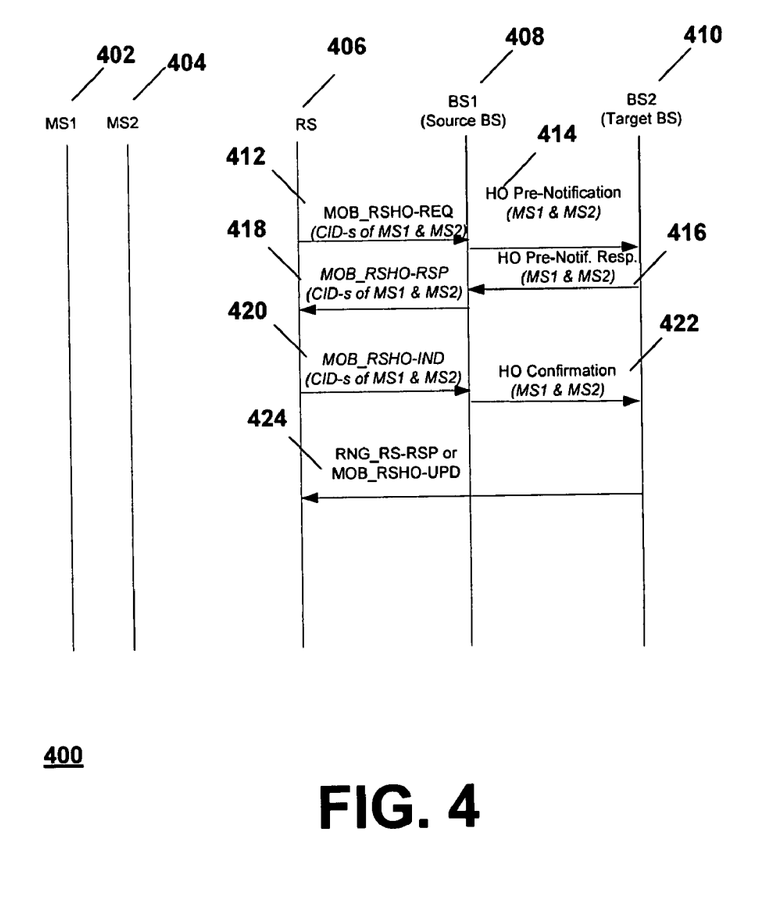
FIG. 4 is a diagram illustrating operation of handover for a plurality of mobile stations according to another example embodiment.

FIG. 4 is a diagram 400 illustrating operation of a relay station handover according to another example embodiment. In the example shown in FIG. 4, mobile stations 402 and 404 (MS1 and MS2) may be in communication with a relay station 406 (RS), which may be in further communication with a source base station (BS1) 408 and a target base station (BS2) 410. Mobile stations 402 and 404 may be moving with relay station 406, in an example embodiment. Mobile stations 402 and 404 may initially be associated with source base station 408. As described in greater detail below, the mobile stations may be handed over to a target base station 410. However, in this example embodiment, the handover to the target base station may be transparent to the mobile stations. This is because, for example, the new identifiers associated with the target base station for each mobile station may be known and used only by the relay station for communicating with the target base station, while the mobile stations may continue to communicate with the relay station using their respective identifiers, e.g., CIDs, associated with the source base station. This may allow one or more handovers to be performed for a mobile station, while decreasing the overhead and complexity for such handovers for the mobile stations. The relay station may, for example, perform a mapping or association between identifiers associated with the source base station to respective identifiers associated with the target base station. Such a mapping may allow, for example, the relay station to forward messages between a mobile station and the target base station after the handover, without necessarily notifying the mobile stations of the handover.

As shown in FIG. 4, a message, e.g., a mobile relay station handover request message (MOB-RSHO-REQ) 412 may optionally be sent from the relay station 406 to the source base station (BS1) 408. The mobile relay station handover request message 412 may include a list or group of indicators of mobile stations, e.g., MS1 402 and MS2 404, to be handed over to the second base station (BS2) 410, for example, including identifiers associating the respective mobile stations 402, 404 with the source base station 408. As discussed above, the identifiers may be any type of identifiers used to identify a particular mobile station 402, 404, and in the example, the identifiers may be mobile station identifiers, connection identifiers (CIDs), or other identifiers. As discussed with regard to FIG. 3, a determination may be made to initiate a handover of the mobile stations 402, 404 from the source base station 408 to the target base station 410 based, for example, on channel quality parameters such as measurement data obtained from scanning signals or other information, for example.

The source base station 408 may then send a handover pre-notification message 414, which may include identification of the mobile stations 402, 404 to be handed over, to the target base station 410. The handover pre-notification message 414 may serve as a request for the target base station 410 to reserve resources and accept handover of the mobile stations 402, 404 from the source base station 408 to the target base station 410. Note, as above for FIG. 3, the RSHO-REQ message 412 and pre-notification message 414 may provide a handover request/notification for a group or plurality of mobile stations, rather than separate request or notification messages being sent for each mobile station, according to an example embodiment.

If the target base station 410 accepts the request and reserves the resources to accommodate the handover, the target base station 410 may send a handover pre-notification response message 416 to the source base station 408 as an acceptance of the request to handover the mobile stations 402, 404, e.g., one message 416 sent to accept the request for the group of mobile stations. The source base station 408 may then send a mobile relay station handover response (MOB-RSHO-RSP) message 418, which includes the identifiers associating the respective mobile stations 402, 404 with the source base station 408, to the relay station 406. The relay station 406 may respond by sending a mobile relay station handover indication (MOB-RSHO-IND) message 420 to the source base station 408 to indicate confirmation by the relay station 406 of the handover for the plurality or group of mobile stations, e.g., 402, 404 in this example. The source base station 408 may then send a handover confirmation message 422 to the target base station 410 informing the target base station 410 that the relay station 406 has acknowledged the handover.

At this point, the target base station 410 may generate new identifiers, for example, connection identifiers, for each of the mobile stations 402, 404. The new identifiers may indicate a connection between each of the mobile stations 402, 404 and the target base station 410. The target base station 410 may then send a ranging relay station response, or a mobile relay station handover update message 424 that includes the new identifiers, for example, the connection identifiers, to the relay station 406. The relay station 406 may now be associated with the target base station 410, and communications may now proceed with the target base station 410.

As noted above, by requesting handover for a group of mobile stations via one message and/or providing one message for handover notification/response/confirmation, the handover for the group of mobile stations may be accomplished while decreasing wireless traffic or overhead.

In the example shown in FIG. 4, the relay station 406 optionally may not forward the new identifiers to the mobile stations 402, 404, but may instead perform a mapping between the previous identifiers, associating the mobile stations 402, 404 with the source base station 408, and the corresponding new identifiers, associating the mobile stations 402, 404 with the target base station 410. The relay station 406 may then exchange messages on the downlink with the mobile stations 402, 404 using the previous identifiers or the identifiers associated with the source base station 408, and may further exchange messages on the uplink with the target base station 410 using the new identifiers, thus establishing a transparency in the communications with the mobile stations 402, 404, in that there is no need for the mobile stations 402, 404 to be informed of the communications with the target base station 410, and thus no need to consume resources to modify the identifiers for the mobile stations 402, 404 as the relay station 406 and the mobile stations 402, 404 may travel together through several different handover scenarios, with the relay station 406 handling the mapping of the identifiers and the communications with the new base stations, and with the mobile stations 402, 404 remaining in a mode of communications as with the initial base station.

Figure 5:
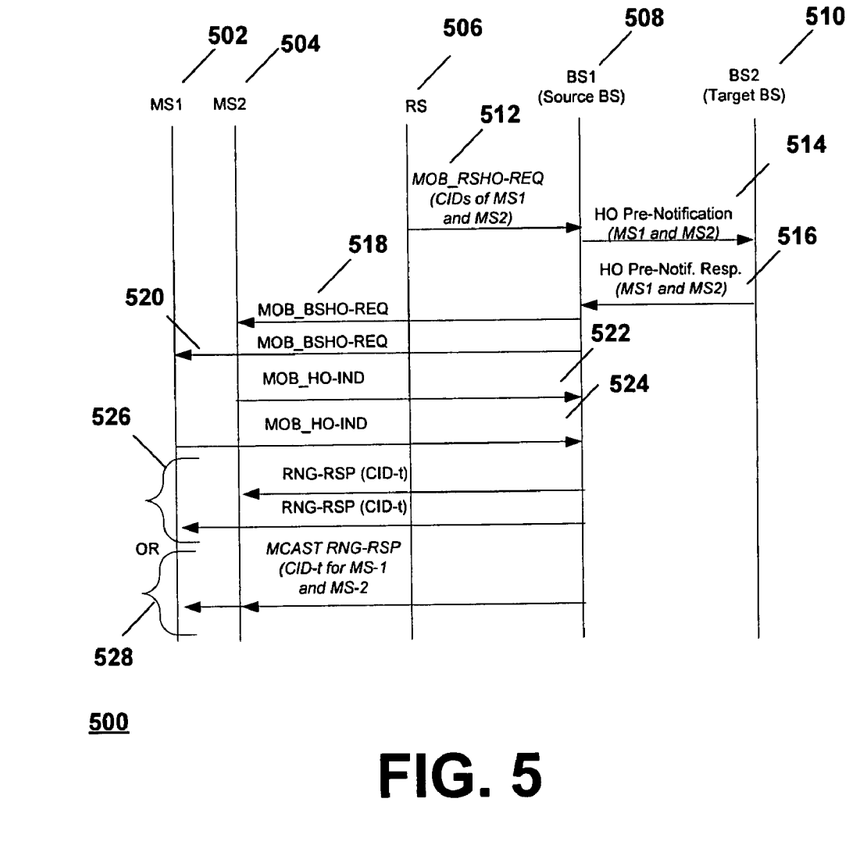
FIG. 5 is a diagram illustrating operation of a handover for a plurality of mobile stations according to a further example embodiment.

FIG. 5 is a diagram 500 illustrating operation of a relay station handover according to a further example embodiment. In the example shown in FIG. 5, mobile stations 502 and 504 (MS1 and MS2) may be in communication with a relay station (RS) 506, which may be in further communication with a source base station (BS1) 508 and a target base station (BS2) 510. In the example embodiment shown in FIG. 5, the relay station 506 may be moving independently from the mobile stations 502, 504. As a result, some of the messages, e.g., messages 518, 520, 522, 524, 526, 528 may be sent directly between source base station 508 and mobile stations 502, 504, since relay station may be out of range of mobile stations. Alternatively, these messages may be sent via relay station 506, if the relay station is within range of the mobile stations, for example.

As shown in the example of FIG. 5, a message, e.g., a mobile relay station handover request message (MOB-RSHO-REQ) 512 may optionally be sent from the relay station 506 to the source base station (BS1) 508. The mobile relay station handover request message 512 may include a list or group of indicators of mobile stations, e.g., MS1 502 and MS2 504, to be handed over to the target, or second base station (BS2) 510, for example, including identifiers associating the respective mobile stations 502, 504 with the source base station 508. As discussed with regard to FIGS. 3 and 4, the identifiers may be any type of identifiers used to identify a particular mobile station 502, 504, and in the example, the identifiers may be connection identifiers (CIDs), as an example. As discussed with regard to FIG. 3, a determination may be made to initiate a handover of the mobile stations 502, 504 from the source base station 508 to the target base station 510 based, for example, on channel quality parameters such as measurement data obtained from scanning signals, for example, or based on other information.

The source base station 508 may then send a handover pre-notification message 514, which includes identification of the mobile stations 502, 504 to be handed over, to the target base station 510. The handover pre-notification message 514 may serve as a request for the target base station 510 to reserve resources and accept handover of the mobile stations 502, 504 from the source base station 508 to the target base station 510. If the target base station 510 accepts the request and reserves the resources to accommodate the handover, the target base station 510 may send a handover pre-notification response message 516, including new identifiers associating the mobile stations 502, 504 with the target base station 510, to the source base station 508 as an acceptance of the request to handover the mobile stations 502, 504. The source base station 508 may then send mobile base station handover request (MOB-BSHO-REQ) messages 518, 520 which include the identifiers associating the respective mobile stations 502, 504 with the source base station 508, to the respective mobile stations 502, 504. The mobile stations 502, 504, respectively, may respond by sending a mobile station handover indication (MOB-HO-IND) message 522, 524 to the source base station 508 to indicate confirmation by the respective mobile station 502, 504 of the handover. The source base station 508 may then send a ranging response message (RNG-RSP) 526 that includes the new identifier to each of the mobile stations 502, 504 as a unicast message.

Alternatively, the source base station 508 may send a ranging response (RNG-RSP) message 528 that includes the new identifiers to the mobile stations 502, 504 as a multicast message. The mobile station 502, 504 then replaces the previous identifier, for example, the connection identifier associating each of the mobile stations 502, 504 with the source base station 508, with the new connection identifier associating each of the mobile stations 502, 504 with the target base station 510. Each of the mobile stations 502, 504 may now be associated with the target base station 510, and communications may now proceed with the target base station 510.

In the example shown in FIG. 5, the relay station 506 may move independently of the mobile stations 502, 504, and thus may be moving out of range of the mobile stations 502, 504, while requesting the handover of the group of mobile stations 502, 504 with a single request message. Alternatively, the source base station 508 may generate the request for handover. Further, it is possible that any or all of the mobile base station handover request (MOB-BSHO-REQ) messages 518, 520, mobile station handover indication (MOB-HO-IND) message 522, 524, ranging response message (RNG-RSP) 526, and/or ranging response (RNG-RSP) message 528, may be sent via the relay station 506, if it is accessible by the respective sender and receiver of the respective message.

Figure 6:
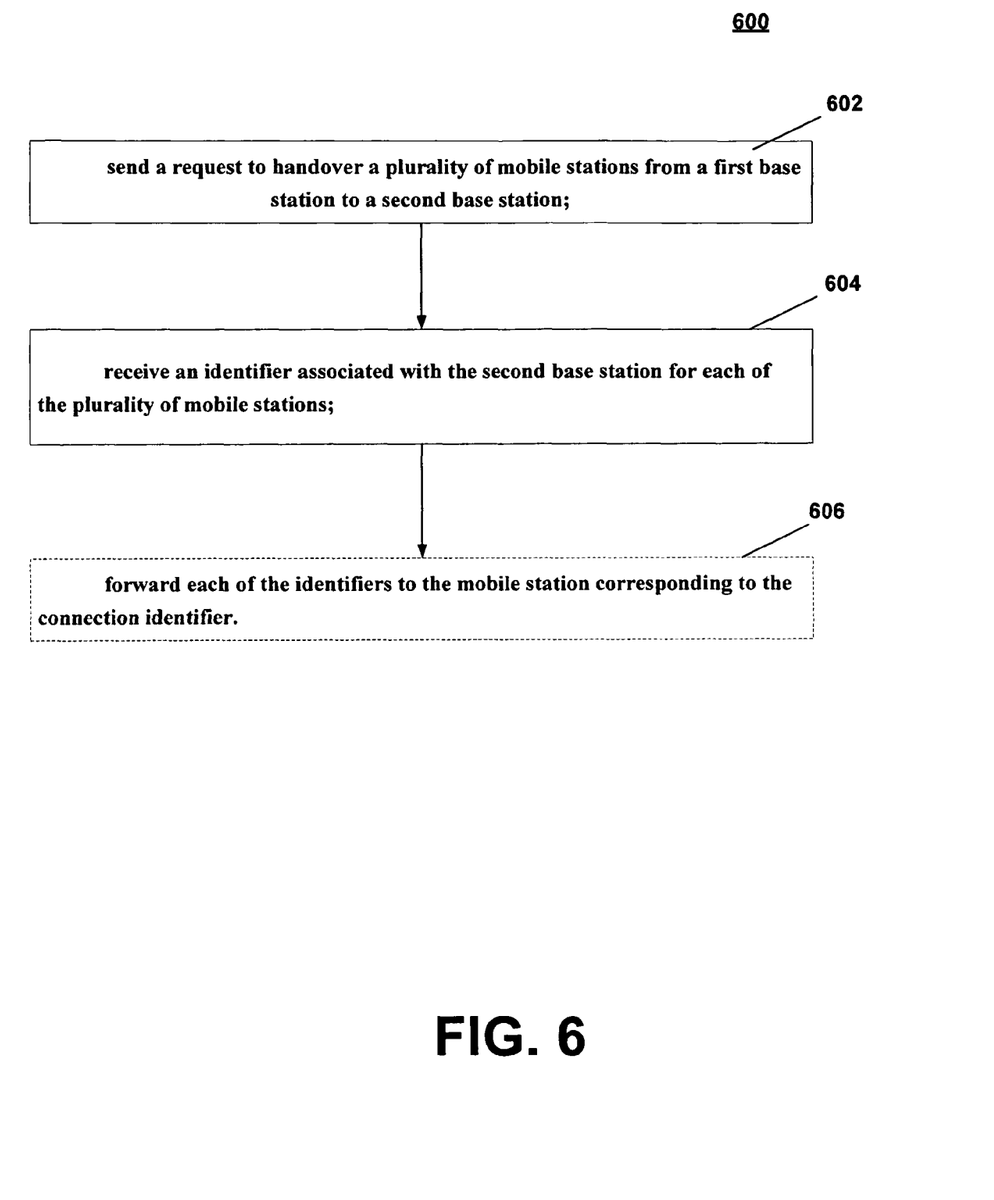
FIG. 6 is a flow chart illustrating operation of a handover for a plurality of mobile stations according to an example embodiment.

FIG. 6 is a flow chart 600 illustrating operation of a relay station handover according to an example embodiment. At 602, a wireless node, such as a relay station or base station or access point, may send a request to handover a plurality of mobile stations, e.g., MS1 112, MS2 114, MS3 116, from a first base station, e.g., BS1 104, to a second base station, e.g., BS2 106. If sent by a relay station, for example RS 110, the request may be sent from the relay station, e.g., RS 110, to the first base station, e.g., BS1 102. As a further example, the relay station 306 may send the request message 312 as shown in FIG. 3. If sent by a base station, e.g., BS1 104, the request may be sent from the first base station, e.g., BS1 104, to the second base station, for example, BS2, 106. As a further example, the source base station 308 may send the request message 314 as shown in FIG. 3. The request may include a mobile relay station handover request that may include a list of identifiers, such as connection identifiers, each of which indicates an association of one of the mobile stations with the first base station. If sent by the first base station, the request may include a handover pre-notification message that includes the list of identifiers each of which indicates an association of one of the mobile stations with the first base station.

At 604, the wireless node may receive an identifier associated with the second base station for each of the plurality of mobile stations. For example, the wireless node may receive a connection identifier associated with the second base station, e.g., BS2 106, for each of the plurality of mobile stations, e.g., MS1 112, MS2 114, MS3 116. If received by a relay station such as RS 110, for example, the identifiers may be included, for example, as a list or group of connection identifiers sent with a mobile relay station handover response message sent, for example, by the first base station, e.g., BS1 104. As a further example, the relay station 306 may receive the response message 318 as shown in FIG. 3. If received by a base station, for example, the identifiers may be received by the first base station, e.g., BS1 104, and the identifiers may be included, for example, as a list of connection identifiers sent with a handover pre-notification response message sent, for example, by the second base station, e.g., BS2 106. As a further example, the source base station 308 may receive the response message 316 as shown in FIG. 3.

At 606, optionally, each of the identifiers may be forwarded to the mobile station corresponding to the identifier. As an example, the relay station 306 may send response message 326 or 328 to the mobile stations 302, 304 as shown in FIG. 3.

Figure 7:
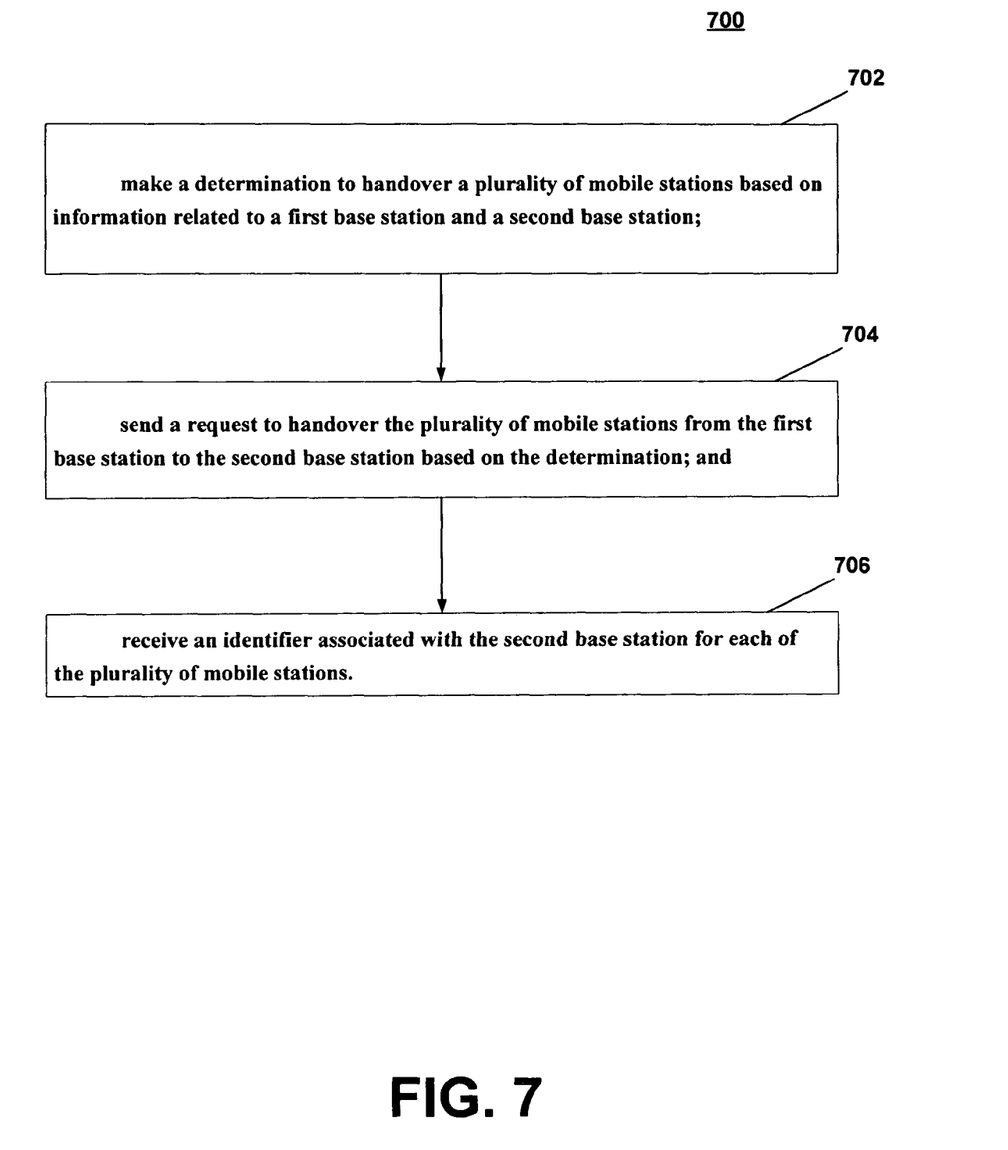
FIG. 7 is a flow chart illustrating operation of handover of a plurality of mobile stations according to another example embodiment.

FIG. 7 is a flow chart 700 illustrating operation of a relay station handover according to another example embodiment. At 702, a determination may be made to handover a plurality of mobile stations, e.g., MS1 112, MS2 114, MS3 116, based on information related to a first base station, e.g., BS1 104, and a second base station, e.g., BS2 106. At 704, a request to handover the plurality of mobile stations from the first base station to the second base station may be sent based on the determination. As discussed previously, the request to handover may be sent by a relay station, e.g., RS 110, or by a base station, e.g., BS1 104. At 706, an identifier associated with the second base station for each of the plurality of mobile stations may be received. As discussed previously, the identifier may be received, e.g., by a base station, e.g., BS1 104, a relay station, e.g., RS 110, and/or by the mobile station, e.g., MS1, 112, MS2 114, MS3 116.

In addition, location update may be performed for a plurality or group of mobile stations via a transmission of a single message over a wireless link, e.g., from a relay station to a target base station.

Figure 8:
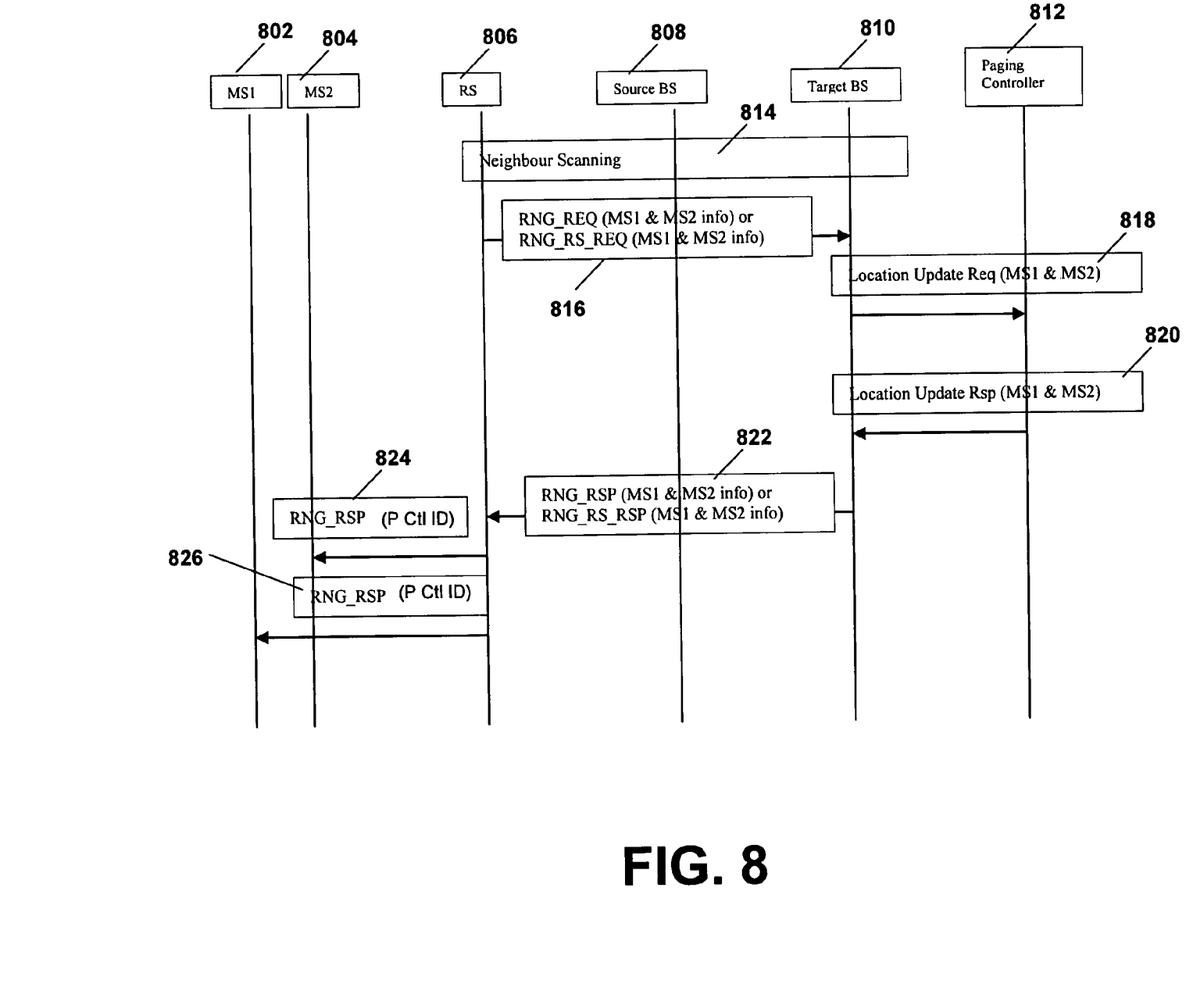
FIG. 8 is a diagram illustrating operation of a location update performed for a plurality of mobile stations according to an example embodiment.

FIG. 8 is a diagram illustrating operation of a location update performed for a plurality of mobile stations according to an example embodiment. According to an example embodiment, although not required, a relay station (RS) 806 may be provided on a moving vehicle, such as a bus, a train, airplane, etc., along with a plurality of mobile stations (MS1 802, MS2 804). Each of the mobile stations 802, 804 may initially communicate with a source base stations 808 via relay station 806, or may be idle.

The wireless network may have multiple paging groups, with each paging group identified by a paging group ID. Each paging group ID may typically be associated with a plurality of base stations, for example. A first paging group ID may be assigned to one or more base stations, including source base station 808. A second paging group ID may be assigned to a target base station 810, among others. A paging controller 812, which may be a logical entity located somewhere in the network, may maintain the location of each mobile stations and relay station. The paging controller 812 may maintain, for example, the MAC address and paging group ID for each mobile station and relay station. When a base station has data or a call to be delivered to a mobile station, the page group ID may be used to identify or page the mobile station. Whenever a mobile station moves, for example, to a new base station having a new paging group ID, the mobile station may scan and receive a paging group ID from the new base station. By comparing a new paging group ID, associated with a new location for the mobile station or relay station, to the old paging group ID, the station may determine that it has moved to a new location associated with the new paging group ID. Thus, in order to provide the paging controller 812 with updated location information for the station, the station may perform a location update.

Referring to FIG. 8, mobile stations 802, 804 and relay station 806, which may be provided on a vehicle or may otherwise be moving, may move to a location near target base station 810. Mobile stations 802, 804 may be idle. Relay station 806 may perform neighbor scanning at 814 and receive a new paging ID associated with the new location for relay station 806. Relay station 806 may determine that it has changed locations based on the new paging group ID.

Ordinarily, without relay station 806 performing location update for the group or plurality of mobile stations 802, 804, etc., each mobile station may typically send its own range request or other message to provide new location update information to the target base station 810 when each mobile station receives the new paging group ID. Thus, if each of the mobile stations 802, 804 attempts to perform location update at about the same time, this could create substantial congestion, collisions, and other problems over the wireless link.

Therefore, according to an example embodiment, a location update may be performed for or on behalf of a plurality of mobile stations using a wireless message sent to a network device such as a target base station from the Relay Station. As shown in FIG. 8, the relay station 806 may send a message 816 to a network device, such as target base station 810, to perform location update for a plurality of mobile stations, such as stations 802, 804, . . . . Sending one message 816 to perform or request location update for the group of mobile stations may be more efficient and decrease congestion over the wireless link, as compared to each mobile station sending an individual location update request. For example, relay station 806 may send a range request message (RNG_REQ) or location update message, and may include the MS identifier (e.g. MAC (medium access control) address), paging group ID and/or security credentials for each mobile station. This information may be provided, for example, within a location update information element within message 816 or can be sent in the new message RNG_RS_REQ from the relay station. This information, MAC address, security credentials, may have been previously provided by each mobile station to relay station 806. The security credentials may include, for example, a hashed message authentication code (HMAC) tuple or code, or a HMAC/CMAC tuple, or other security credentials. In this manner, relay station 806 may perform location update for a plurality or group of mobile stations. The relay station 806 may perform a secure location update for a mobile station where the relay station 806 provides the security credentials, if the relay station 806 has the mobile station's security credentials. Alternatively, the relay station 806 may perform an unsecured location update for each mobile station. Relay station 806 may provide its own MAC address and paging group ID in the message 816 so as to perform location update for itself as well as the mobile stations.

Next, the target base station 810, may send a location update request message 818 to paging controller 812, including MAC address or other mobile station identifier and paging group ID for each mobile station. Message 818 may, for example, be one message forwarding the MAC address and paging group ID for the group of mobile stations, or may instead be a plurality of messages, or even one location update message for each mobile station. This is because the message 818 may be transmitted from base station 810 to paging controller 812 over a wired link, and thus, the same concerns with wireless congestion and collisions may not apply. Thus, the location update.

The target base station 810 may then receive a location update response message 820 from the paging controller 812, including the MAC addresses and paging group ID for each mobile station, confirming that the location update at the paging controller 812 was performed or accomplished for the plurality of mobile stations. Location update response message 820 may be received as a single message for the group of mobile stations, or may receive a plurality of messages or even one message for each mobile station, as examples.

Next, target base station 810 may send a message 822, such as a ranging response (RNG_RSP) message or RNG_RS_RSP (new message), notifying the relay station that the location update for the plurality of mobile stations was performed, identifying the MAC address and paging Controller ID for each mobile station. Note, that message 822 may be sent as one message for the plurality of mobile stations, rather than sending individual messages for each mobile station, in order to decrease congestion over the wireless link and improve efficiency. This operation may be considered a combined or group location update procedure, since a location update is performed for a group of mobile stations via a single message or single message exchange, such as messages 816 and 822 via the wireless link. Upon receipt of message 822 confirming the location update for the plurality of mobile stations and the relay station, relay station 806 may send a message 824, 826, such as a ranging response, to provide the new paging controller ID to each mobile station. Messages 824, 826 to mobile stations may be provided, for example, as unicast messages or a multicast message for the group for mobile stations.

Figure 9:
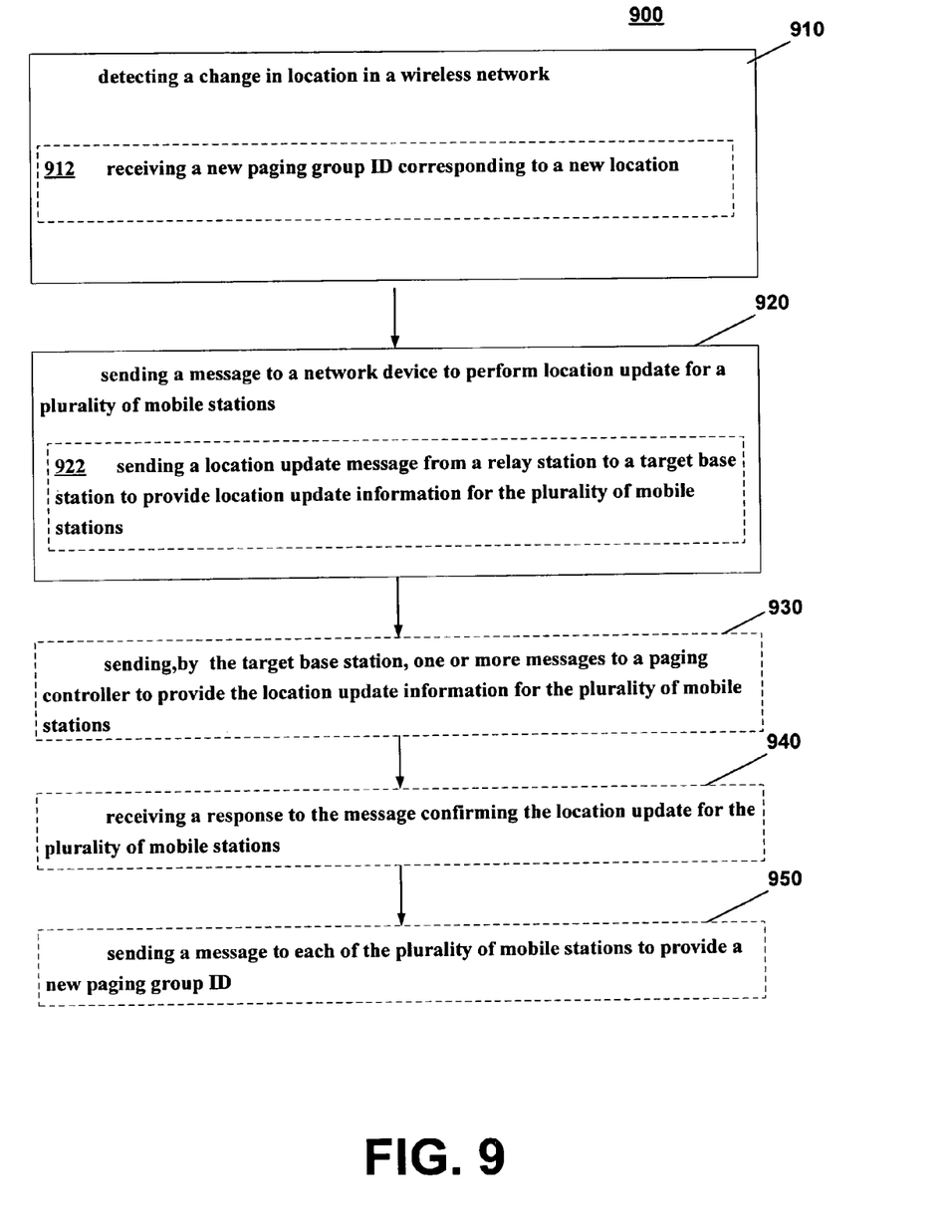
FIG. 9 is a flow chart illustrating diagram illustrating operation of a location update performed for a plurality of mobile stations according to an example embodiment.

FIG. 9 is a flow chart 900 illustrating diagram illustrating operation of a location update performed for a plurality of mobile stations according to an example embodiment. At 910, a change in location is detected in a wireless network, e.g., a relay station detecting a change in its location. Operation 910 may include, for example, receiving a new paging group ID corresponding to the new location.

At 920, a message is sent to a network device, such as a base station, to perform location update for a plurality of mobile stations. By sending one message to request location update for a plurality of mobile stations, rather than sending individual location update messages, this may decrease congestion over the wireless link and improve efficiency. Operation 920 may include sending a location update message from a relay station to a target base station to provide location update information for the plurality of stations, 922.

The flow chart 900 may include one or more additional operations, according to alternative embodiments, such as operations 930, 940 and 950. At 930, the target base station may send one or more messages to a paging controller to provide the location update information for the plurality of mobile stations. At 940, a response message may be received, e.g., by the relay station, confirming the location update for the plurality of mobile stations. At 950, a message may be sent, e.g., by the relay station, to each of the plurality of mobile stations to provide a new paging controller ID. The mobile stations already know the new paging ID since they received this information by scanning.

Figure 10:
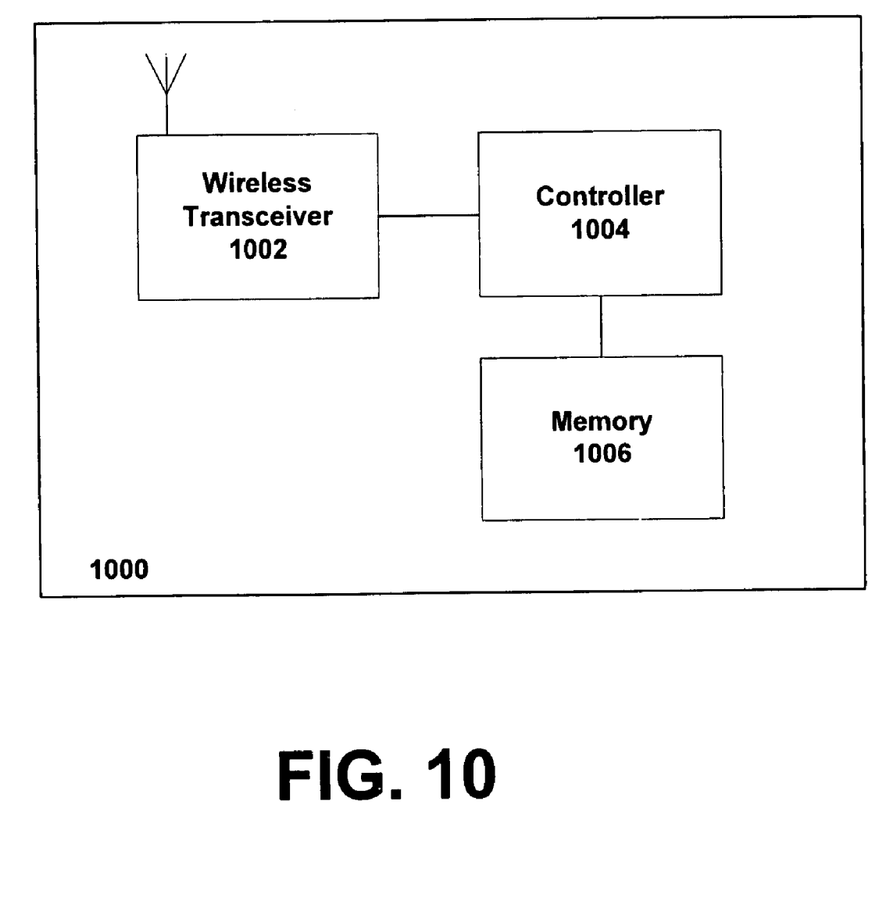
FIG. 10 is a block diagram illustrating an apparatus that may be provided in a wireless station according to an example embodiment.

FIG. 10 is a block diagram illustrating an apparatus 1000 that may be provided in a wireless station according to an example embodiment. The wireless station may include, for example, a wireless transceiver 1002 to transmit and receive signals, a controller 1004 to control operation of the station and execute instructions or software, and a memory 1006 to store data and/or instructions. Controller 1004 may be programmable, and capable of executing software or other instructions stored in memory or on other computer media to perform the various tasks and functions described above. In addition, a storage medium may be provided that includes stored instructions, when executed by a controller or processor that may result in the controller 1004 performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   sending, by an apparatus to a first base station, a request to handover a plurality of mobile stations from the first base station to a second base station;
   receiving, by the apparatus in a single message received from at least one of the first base station and the second base station, an identifier associated with the second base station for each of the plurality of mobile stations;
   determining an identifier associated with the first base station for each of the plurality of mobile stations;
   performing a mapping between the identifiers associated with the first base station and corresponding identifiers associated with the second base station; and
   communicating with each mobile station using the identifier of the each mobile station that is associated with the first base station, and communicating with the second base station using the identifier of the each mobile station that is associated with the second base station, based on the mapping.

2. The method of claim 1 wherein the sending the request to handover comprises:
   receiving information related to the first base station and the second base station; and
   making a determination to handover the plurality of mobile stations based on the received information.

3. The method of claim 1 wherein the sending the request to handover comprises:
   receiving a channel quality parameter for the first base station and a channel quality parameter for the second base station; and
   making a determination to handover the plurality of mobile stations based on the received channel quality parameters.

4. The method of claim 1 wherein:
   the sending the request to handover comprises sending, by a relay station, the request to handover the plurality of mobile stations from the first base station to the second base station, and
   the receiving the identifier comprises receiving, by the relay station, the identifier associated with the second base station for each of the plurality of mobile stations.

5. The method of claim 1 wherein:
   the sending the request to handover comprises sending, by the first base station, the request to handover the plurality of mobile stations from the first base station to the second base station, and
   the receiving the identifier comprises receiving, by a relay station, the identifier associated with the second base station for each of the plurality of mobile stations.

6. The method of claim 1 wherein the receiving the identifier comprises receiving a connection identifier associated with the second base station for each of the plurality of mobile stations.

7. The method of claim 1 and further comprising forwarding each of the identifiers to the mobile station corresponding to the identifier.

8. The method of claim 1 and further comprising:
   forwarding messages between one of the mobile stations and the second base station by substituting an identifier associated with the first base station for communicating with the one mobile station and communicating with the second base station using the identifier associated with the second base station for the one mobile station.

9. The method of claim 1 wherein the sending comprises sending a relay station handover request including a connection identifier associated with the first base station for each of the plurality of mobile stations.

10. The method of claim 1 wherein the sending comprises sending a handover pre-notification message including connection identifiers associated with the first base station for each of the plurality of mobile stations.

11. The method of claim 1 wherein the receiving comprises receiving either a relay station handover response including connection identifiers associated with the second base station for each of the plurality of mobile stations or a handover pre-notification message including connection identifiers associated with the second base station for each of the plurality of mobile stations.

12. The method of claim 1, wherein the single message is received in response to the request.

13. The method of claim 1, wherein the sending, receiving, determining, performing, and communicating are all performed by the apparatus.

14. An apparatus comprising:
a transmitter configured to send, to a first base station, a request to handover a plurality of mobile stations from the first base station to a second base station;
a receiver configured to receive, in a single message received from at least on of the first base station and the second base station, an identifier associated with the second base station for each of the plurality of mobile stations,
wherein the apparatus is configured to:
determine an identifier associated with the first base station for each of the plurality of mobile stations;
perform a mapping between the identifiers associated with the first base station and corresponding identifiers associated with the second base station; and
communicate with each mobile station using the identifier of the each mobile station that is associated with the first base station, and communicate with the second base station using the identifier of the each mobile station that is associated with the second base station.

15. The apparatus of claim 14 wherein the request to handover includes a plurality of indicators each associated with one of the plurality of mobile stations.

* * * * *